United States Patent
Palanca et al.

(10) Patent No.: US 6,205,520 B1
(45) Date of Patent: *Mar. 20, 2001

(54) METHOD AND APPARATUS FOR IMPLEMENTING NON-TEMPORAL STORES

(75) Inventors: Salvador Palanca; Vladimir Pentkovski, both of Folsom; Steve Tsai, Rancho Cordova; Subramaniam Maiyuran, Fair Oaks, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/053,387

(22) Filed: Mar. 31, 1998

(51) Int. Cl.⁷ .................................................. G06F 12/00
(52) U.S. Cl. .......................... 711/138; 711/118; 711/125; 711/133; 711/137; 711/128; 711/129; 711/145; 711/160
(58) Field of Search ........................... 711/118, 125, 711/133, 137, 138, 145, 128, 129, 160

(56) References Cited

U.S. PATENT DOCUMENTS

| | | | |
|---|---|---|---|
| 5,404,484 | * 4/1995 | Schlansker et al. | 711/133 |
| 5,526,510 | * 6/1996 | Akkary et al. | 711/133 |
| 5,630,075 | * 5/1997 | Joshi et al. | 711/100 |
| 5,671,444 | * 9/1997 | Akkary et al. | 710/52 |
| 5,680,572 | * 10/1997 | Akkary et al. | 711/126 |
| 5,829,025 | * 10/1998 | Mittal | 711/122 |
| 5,829,026 | * 10/1998 | Leung et al. | 711/122 |

OTHER PUBLICATIONS

21164 Alpha Microprocessor Data Sheet, 1997 Samsung Electronics, pp. 1–77.

TM1000 Preliminary Data Book, (Tri Media), 1997, Philips Electronics.

Visual Instruction Set (VIS) User's Guide, Sun Microsystems, version 1.1, Mar. 1997, pp. 1–127.

AMD–3D Technology manual, /Rev. B, Feb. 1998, pp. 1–58.

The UltraSPARC Processor—Technology White Paper The UltraSPARC Architecture, Sun Microsystems, Jul. 17, 1997, pp. 1–10.

* cited by examiner

*Primary Examiner*—Meng-Ai T. An
*Assistant Examiner*—Nabil El-Hady
(74) *Attorney, Agent, or Firm*—Blakely, Sokoloff, Taylor & Zafman LLP

(57) ABSTRACT

A processor is disclosed. The processor includes a decoder to decode instructions and a circuit, in response to a decoded instruction, detects an incoming write back or write through streaming store instruction that misses a cache and allocates a buffer in write combining mode. The circuit, in response to a second decoded instruction, detects either an uncacheable speculative write combining store instruction or a second write back streaming store or write through streaming store instruction that hits the buffer and merges the second decoded instruction with the buffer.

19 Claims, 6 Drawing Sheets

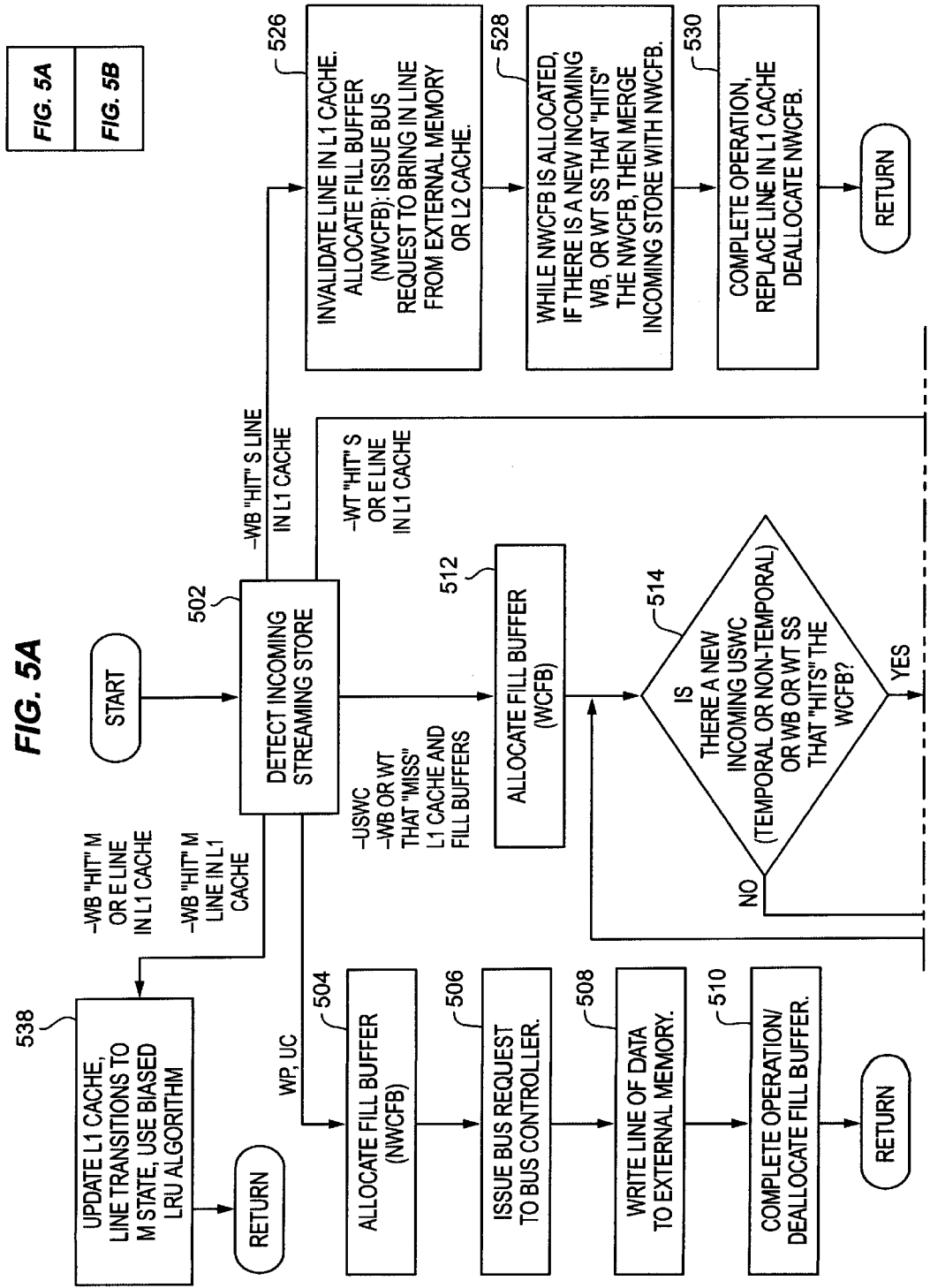

METHOD AND APPARATUS FOR IMPLEMENTING NON-TEMPORAL STORES

BACKGROUND OF THE INVENTION

1. Field of the Invention

The present invention relates generally to the field of processors, and specifically, to a method and apparatus for implementing non-temporal stores.

2. Background Information

The use of a cache memory with a processor is well known in the computer art. A primary purpose of utilizing cache memory is to bring the data closer to the processor in order for the processor to operate on that data. It is generally understood that memory devices closer to the processor operate faster than memory devices farther away on the data path from the processor. However, there is a cost trade-off in utilizing faster memory devices. The faster the data access, the higher the cost to store a bit of data. Accordingly, a cache memory tends to be much smaller in storage capacity than main memory, but is faster in accessing the data.

A computer system may utilize one or more levels of cache memory. Allocation and de-allocation schemes implemented for the cache for various known computer systems are generally similar in practice. That is, data that is required by the processor is cached in the cache memory (or memories). If a cache miss occurs, then an allocation is made at the entry indexed by the access. The access can be for loading data to the processor or storing data from the processor to memory. The cached information is retained by the cache memory until it is no longer needed, made invalid or replaced by other data, in which instances the cache entry is de-allocated.

Recently, there has been an increase in demand on processors to provide high performance for graphics applications, especially three-dimensional graphics applications. The impetus behind the increase in demand is mainly due to the fact that graphics applications tend to cause the processor to move large amounts of data (e.g., display data) from cache and/or system memory to a display device. This data, for the most part, is used once or at most only a few times (referred to as "non-reusable data").

For example, assume a cache set with two ways, one with data A and another with data B. Assume further that data A, data B, and data C target the same cache set, and also assume that a program reads and writes data A and data B multiple times. In the middle of the reads and writes of data A and data B. if the program performs an access of non-reusable data C, the cache will have to evict, for example, data A from line one and replace it with data C. If the program then tries to access data A again, a cache "miss" occurs, in which case data A is retrieved from external memory and data B is evicted from line two and replaced with data A. If the program then tries to access data B again, another cache "miss" occurs, in which case data B is retrieved from external memory and data C is evicted from line one and replaced with data B. Since data C is non-reusable by the program, this procedure wastes a considerable amount of clock cycles, decreases efficiency, and pollutes the cache.

Therefore, there is a need in the technology for a method and apparatus to efficiently write non-reusable data to external memory without polluting cache memory.

A further bottle neck in data intensive applications such as three-dimensional applications, in addition to the processor, is the memory and bus bandwidth. That is, data intensive applications require a considerable amount of bus transactions to and from system memory.

Therefore, there is an additional need in the technology for a method and apparatus to efficiently write non-reusable data to external memory without polluting cache memory while minimizing bus transactions.

SUMMARY OF THE INVENTION

In one embodiment, the present invention is a processor that includes a decoder to decode instructions and a circuit. The circuit, in response to a decoded instruction, detects an incoming write back or write through streaming store instruction that misses a cache and allocates a buffer in write combining mode.

BRIEF DESCRIPTION OF THE DRAWINGS

The features and advantages of the present invention will become apparent from the following detailed description of the present invention in which.

DETAILED DESCRIPTION

The present invention is a method and apparatus for implementing non-temporal stores. In the following description, for purposes of explanation, numerous details are set forth in order to provide a thorough understanding of the present invention. However, it will be apparent to one skilled in the art that these specific details are not required in order to practice the present invention.

As hereinafter described, non-temporal data refers to data that is intended to be used once or at most a limited number of times by the processor whereas temporal data is data that is intended to be used more than non-temporal data (e.g., used repeatedly). Moreover, weakly-ordered instructions are instructions that can be executed out of program order, i.e., a M-th sequential instruction in a program may be executed before a (M−N)-th sequential instruction (where M and N are positive whole numbers and M>N). On the other hand, strongly ordered instructions are instructions that are executed in program order. A line of data refers to thirty-two bytes of data, as presently utilized in microprocessor-based systems, although it is within the scope of the present invention if a line of data refers to more or less bytes of data.

A cache "hit" occurs when the address of an incoming instruction matches one of the valid entries in the cache. For example, in the MESI protocol, a line in the cache has a valid entry when it is in modified "M", exclusive "E", or shared "S" state. A cache "miss" occurs when the address of an incoming instruction does not match any valid entries in the cache. For sake of clarity, the cache is described with respect to the MESI protocol, however, any other protocol or cache consistency model may be used. A fill buffer in normal mode is referred to as a non-write combining fill buffer ("NWCFB") and a fill buffer in write combining mode is referred to as a write combining fill buffer ("WCFB"). Write combining is the process of combining writes to the same line of data in the buffer, thereby diminishing the number of external bus transactions required.

Figure 1:
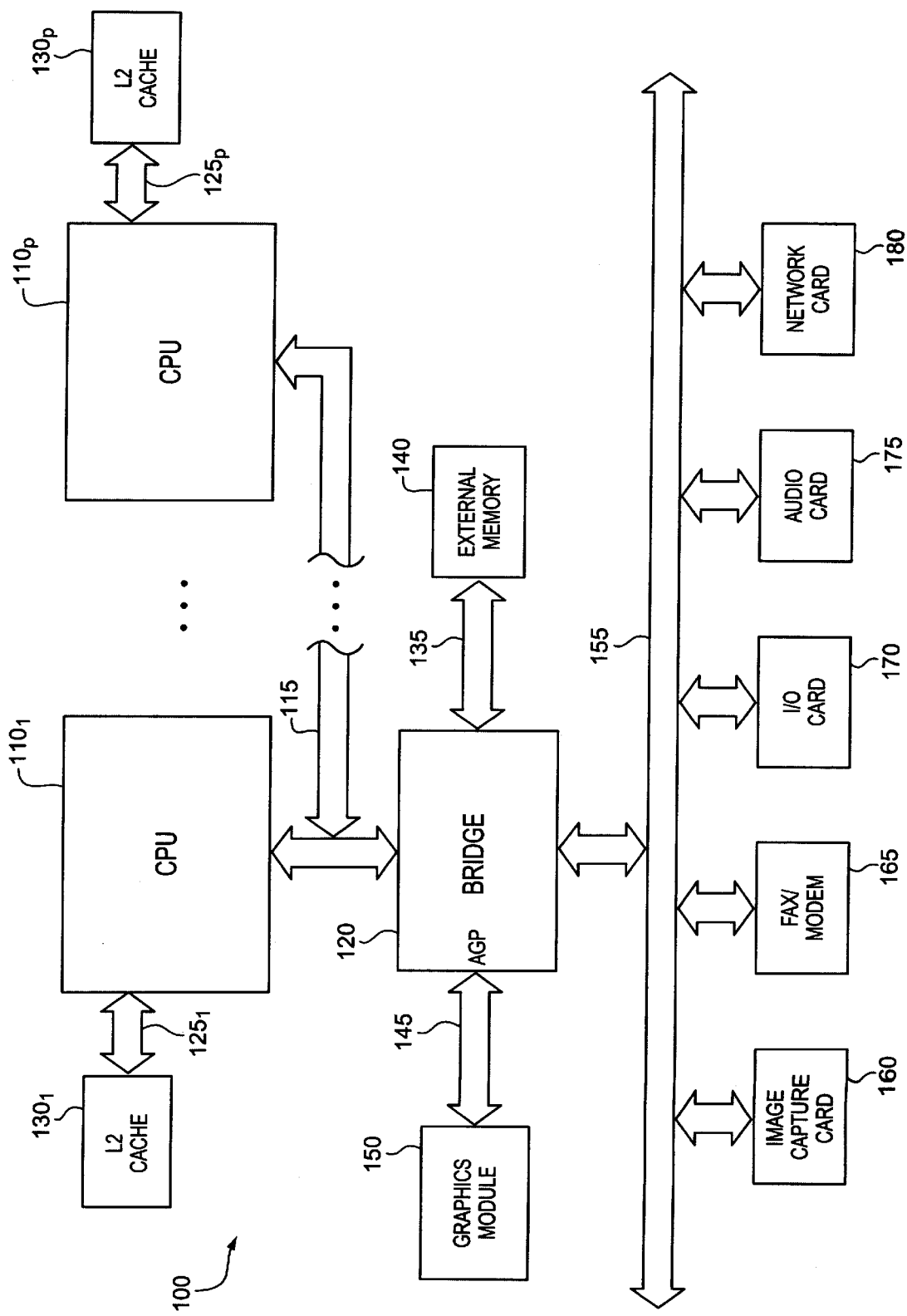
FIG. 1 illustrates an exemplary embodiment of a computer system in accordance with the teachings of the present invention.

FIG. 1 illustrates an exemplary embodiment of a computer system 100 in accordance with the teachings of the present invention. Referring to FIG. 1, computer system 100 comprises one or more central processing units ("CPUs") $110_1$–$110_P$ (where P is a positive whole number), coupled to a bridge 120 by way of a host bus 115. Each CPU 110 is also coupled to a Level 2 ("L2") cache 130 by way of a backside bus 125. Each CPU 110 may be of any type, such as a complex instruction set computer ("CISC"), reduced instruction set computer ("RISC"), very long instruction word ("VLIW"), or hybrid architecture. In addition, each CPU 110 could be implemented on one or more chips. Through an AGP port, the bridge 120 may be coupled to a graphics module 150 by way of a graphics bus 145. The bridge is also coupled to external memory 140 (e.g., static random access memory "SRAM", dynamic RAM "DRAM", etc.) by way of an external bus 135 and an expansion bus 155. In one embodiment, the expansion bus 155 is, for example, a peripheral component interconnect ("PCI") bus, an Extended Industry Standard Architecture ("EISA") bus, or a combination of such busses.

A number of peripheral devices including an image capture card 160, fax/modem card 165, input/output ("I/O") card 170, audio card 175, network card 180, and the like, may be optionally coupled to the expansion bus 155. The image capture card 160 represents one or more devices for digitizing images (i.e., a scanner, camera, etc.). The fax/modem card 165 represents a fax and/or modem for receiving and/or transmitting analog signals representing data. The audio card 175 represents one or more devices for inputting and/or outputting sound (e.g., microphones, speakers, etc.). The network card 180 represents one or more network connections (e.g., an Ethernet connection). However, it must be noted that the architecture of computer system 100 is exemplary and is apparent to one skilled in the art that such architecture is not critical in practicing the present invention.

Figure 2:
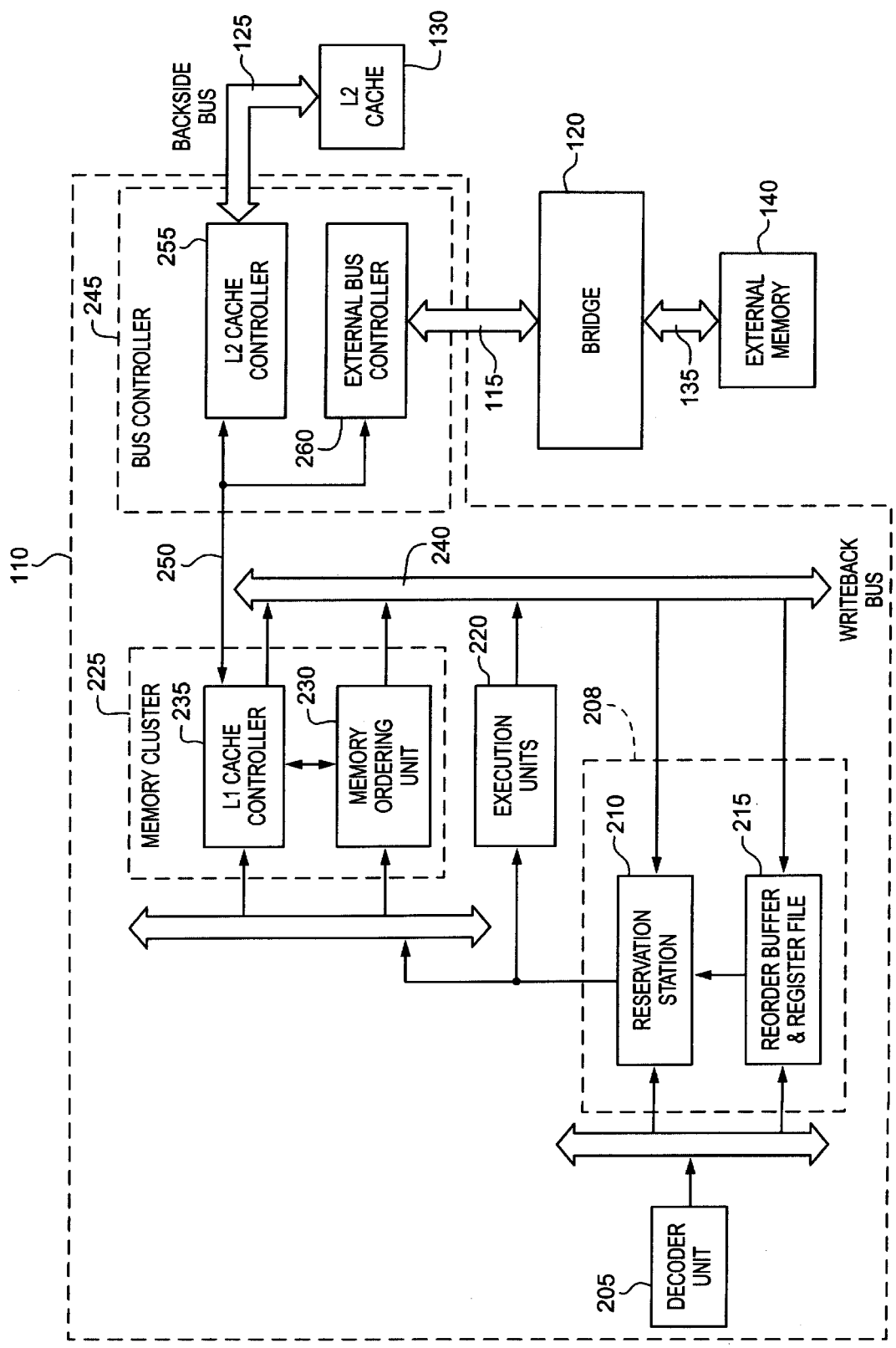
FIG. 2 illustrates exemplary structures of the CPU where a multiple cache arrangement is implemented.

FIG. 2 illustrates exemplary structures of the CPU 110 implementing a multiple cache arrangement. Referring to FIG. 2, the CPU 110 includes, among other things, a decoder unit 205, a processor core 208, execution units 220, a memory cluster 225 having a memory ordering unit ("MOU") 230 and a Level 1 ("L1") cache controller 235, and a bus controller 245 having a L2 cache controller 255 and an external bus controller 260. In one embodiment, the CPU 110 is an out-of-order processor, in which case the processor core 208 includes a reservation station 210 and a logical block having a reorder buffer and a register file 215. It is to be noted that there are other well known or new out-of-order execution architectures. However, in another embodiment, the CPU 110 is an in-order processor, in which case the reservation station 210 and/or the reorder buffer may not be needed. In either case, the present invention operates with any type of processor (e.g., out-of-order, in-order, etc.). For clarity sake, all references made to the reorder buffer and/or the register file will be designated by numeral 215, even though they are separate logical units within the logical block 215. The register file 215 includes a plurality of general purpose registers. It is to be appreciated that the CPU 110 actually includes many more components than just the components shown. Thus, only those structures useful to the understanding of the present invention are shown in FIG. 2.

The decoder unit 205 decodes instructions and forwards them to the reservation station 210 and the reorder buffer 215 of the processor core 208. The processor core 208 is coupled to the execution units 220 and the memory cluster 225 for dispatching instructions to the same. The memory cluster 225 writes back information to the processor core 208 by way of a writeback bus 240. The L1 cache controller 235 is coupled to the L2 cache controller 255 and the external bus controller by way of a bus 250. The L2 cache controller 255 controls the L2 cache 130, and the external bus controller 260 interfaces with external memory 140 through the bridge 120.

Figure 3:
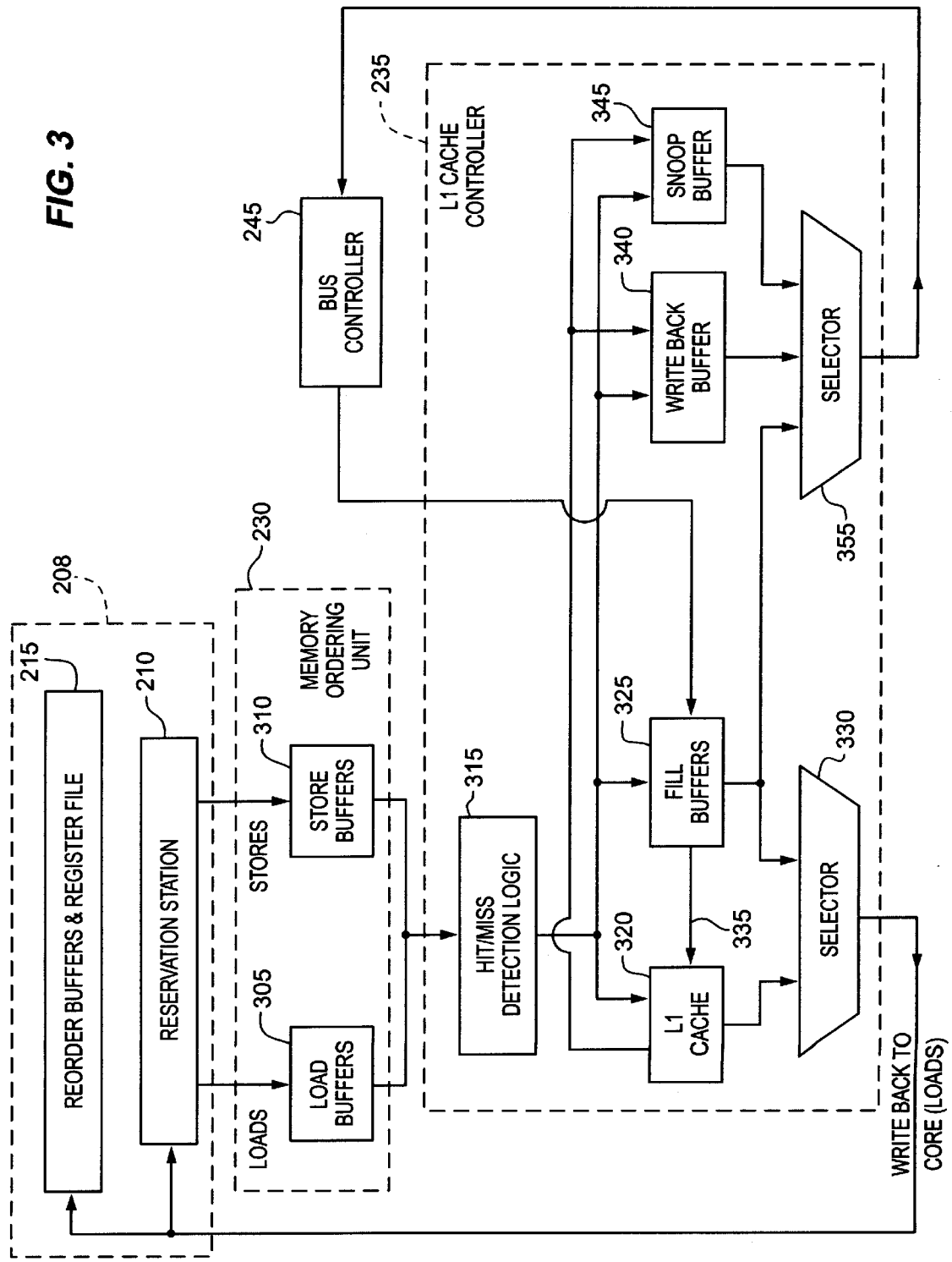
FIG. 3 illustrates exemplary logical units of the memory ordering unit and the L1 cache controller and the interconnection therebetween according to one embodiment of the present invention.

FIG. 3 illustrates exemplary logical units of the memory ordering unit 230 and the L1 cache controller 235 and the interconnection therebetween according to one embodiment of the present invention. Referring to FIG. 3, the MOU 230 includes a load buffer 305 which buffers a plurality (e.g., 16 entries) of load (or read) instructions (or requests) and a store buffer 310 which buffers a plurality (e.g., 12 entries) of store (or write) instructions. Alternatively, the MOU 230 may use a single unified buffer which buffers both load and store instructions. The addresses of the load and store instructions are transmitted to, among other things, a hit/miss detection logic 315 of the L1 cache controller 235. The hit/miss detection logic 315 is coupled to a L1 cache 320, a plurality of L1 cache controller buffers 325 (each hereinafter referred to as a "fill buffer"), a write back buffer ("WBB") 340, and a snoop buffer ("SB") 345. The hit/miss detection logic 315 determines whether the incoming instruction (e.g., load, store, etc.) "hits" either the L1 cache 320, fill buffers 325, WBB 340, or SB 345 (performs an address comparison).

The L1 cache 320 and the fill buffers 325 (e.g., four) are coupled to a selector 330 (e.g., a multiplexer) for returning load request data back to the reservation station 210 and/or the reorder buffer and register file 215 of the processor core 208. The fill buffers 325 are also coupled to the L1 cache 320 by way of path A (bus 335 ) to write data to the L1 cache 320. The L1 cache 320 is also coupled to the WBB 340 and the SB 345. In addition, the fill buffers 325, WBB 340, and SB 345 are coupled to a second selector 355 for writing data to the bus controller 245. The bus controller 345 is coupled to the fill buffers 325 for loading data into the same. That is, in this embodiment, load requests to the bus controller 245 are always brought into the fill buffers 325.

Continuing to refer to FIG. 3, the WBB 340 is used to write a line of data in the M state from the L1 cache 320, which has been evicted, to external memory 140. The SB 345 is used when the CPU 110 receives an external snoop from another CPU in the system (e.g., CPUs $110_2$–$110_P$), and the result of the snoop is that it "hits" a line in M state in the L1 cache 320 (i.e., L1 cache of CPU 110 ). The external snoop is the result of another CPU in the system trying to access the same line that is in the M state in the L1 cache of CPU 110. After the snoop "hit", the CPU 110 places the M line in the SB 345, and from there, sends it to external memory. The other CPU in the system, from where the snoop originated, can now access the line from external memory 140.

Loads and stores, which are dispatched to the L1 cache controller 235, have an associated memory type. In one embodiment, each CPU 110 supports five memory types including write back ("WB"), write through ("WT"), uncacheable speculative write combining ("USWC"), uncacheable ("UC"), and write protected ("WP"). An example of a UC memory type is an access to memory mapped I/O. WB memory type is cacheable whereas USWC and UC memory types are uncacheable. WP writes are uncacheable, but WP reads are cacheable. WT reads are also cacheable. WT writes that "hit" the L1 cache 320 update both the L1 cache and external memory, whereas WT writes that "miss" the L1 cache 320 only update external memory. USWC writes are weakly ordered, which means that subsequent instructions may execute out of order with respect to a USWC write or the USWC write may execute out of order with respect to previous instructions. On the other hand, UC stores are strongly ordered, and they execute in program order with respect to other stores.

Figure 4:
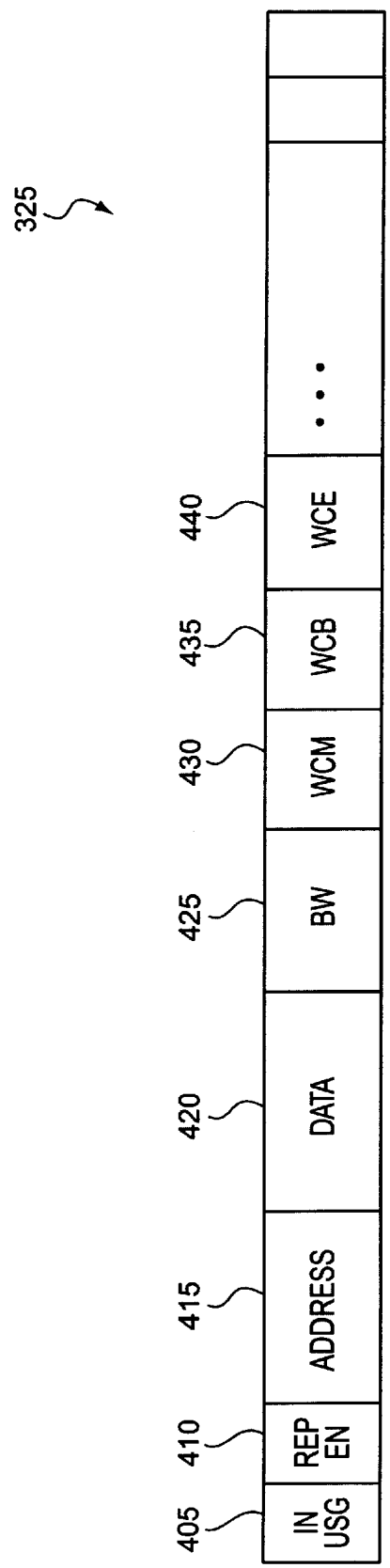
FIG. 4 illustrates various control fields of an exemplary fill buffer suitable for use with the present invention.

FIG. 4 illustrates various control fields of an exemplary fill buffer 325 suitable for use with the present invention. Referring to FIG. 4, each fill buffer 325 includes, among other fields, the following control fields: (i) "In Use" control field 405 which is set when the fill buffer is allocated (e.g., on a L1 read "miss") and cleared when it is deallocated; (ii) "RepEn" field 410 which specifies whether a line of data that is returned from the bus controller 245 is to be written into the L1 cache 320; (iii) Address field 415 which includes the address of the request; (iv) Data field 420 which includes the data that is returned to the fill buffer on a load request and contains valid data to be written on a store request; (v) Byte written ("BW") field 425 which includes one bit for each byte in the Data field and, for all writes, including those in write combining mode, indicates the bytes within the line which are written by a store from the processor core 208 (e.g., a register); (vi) Write Combining Mode ("WCM") field 430 which specifies whether the fill buffer is in write combining mode; (vii) Write Combining Buffer ("WCB") field 435 which specifies that the buffer is a write combining buffer; and (viii) Write Combining Evicted ("WCE") field 440 which specifies whether the write combining buffer is evicted. In this embodiment, the WCM bit is always cleared on eviction or when the fill buffer is fully written (i.e., all BW bits are set) from start of eviction until the buffer is allocated again to service another write combining instruction.

Upon allocating a fill buffer, if the WCB bit is cleared, the fill buffer is a NWCFB and if the WCB bit is set the fill buffer is a WCFB. In write combining mode, cacheable non-temporal stores behave as weakly-ordered write-combining stores in that they can be executed out of order with respect to cacheable instructions and non-strongly ordered uncacheable instructions. Moreover, if a fill buffer is allocated in write-combining mode for a USWC or non-temporal store instruction (WCFB), the buffer remains allocated and will write combine with other write combinable stores of the same type until either all bytes in the fill buffer are written (i.e., all BW bits are set) or there is an eviction condition, in which case the fill buffer initiates a request to the bus controller 245 to write the line of data to external memory 140. Strongly ordered uncacheable store and fencing instructions are examples of instructions that are strongly ordered and cause eviction of a WCFB. The fencing instruction is described in U.S. Pat. No. 6,073,210 entitled "Synchronization of Weakly Ordered Write Combining Operations Using a Fencing Mechanism" by Salvador Palanca et al., issued May 6, 2000 and assigned to the assignee of the present invention.

If a NWCFB is allocated, it could be to service either loads or stores. Therefore, the request could be to receive data from or send data to the bus controller 245. On cacheable loads (e.g., WB, WT, or WP) or cacheable temporal stores (e.g., temporal WB stores), the line of data is placed in a fill buffer from either the L2 cache 130 or external memory 140. Thereafter, the data is written to the L1 cache 320. On uncacheable reads (e.g., USWC or UC), only the requested data, not the whole line is brought into the fill buffer from external memory. Thereafter, the data is forwarded to the processor core 208 (e.g., register file). In this case, data is not placed in the L1 cache 320. On a NWCFB servicing WT, WP, or UC stores, only the requested data, not the whole line, is transferred from the fill buffer to external memory. In either case, once the instruction is completed, the NWCFB is deallocated. On the other hand, if a WCFB is allocated, the fill buffer will remain in write combine mode and not issue a bus request until either the fill buffer is full (i.e., all BW bits are set) or there is an eviction condition. If subsequent writes, which are write-combinable, "hit" the fill buffer, the writes combine. That is, data (e.g., one, two, four, eight bytes) is transferred from the processor core 208 to the corresponding bytes in the fill buffer 350 and the corresponding BW bits are set. If the fill buffer is full, a single transaction is performed to write the entire line of data to memory. If the fill buffer is not full upon detection of an eviction condition, the required write transactions are performed to update external memory depending on the BW bits which are set.

Referring back to FIGS. 2 and 3, two separate cache memories 320 and 130 are shown. The caches memories 320 and 130 are arranged serially and each is representative of a cache level, referred to as L1 cache and L2 cache, respectively. Furthermore, the L1 cache 320 is shown as part of the CPU 110, while the L2 cache 130 is shown external to the CPU 110. This structure exemplifies the current practice of placing the L1 cache on the processor chip while higher level caches are placed external to it. The actual placement of the various cache memories is a design choice or dictated by the processor architecture. Thus, it is appreciated that the L1 cache 320 could be placed external to the CPU 110. The caches can be used to cache data, instructions or both. In some systems, the L1 (and/or L2 ) cache is actually split into two sections, one section for caching data and one section for caching instructions. However, for simplicity of explanation, the various caches described in the Figures are shown as single caches with data.

As noted, only two caches 320 and 130 are shown. However, the computer system need not be limited to only two levels of cache. For example, a third level ("L3") cache may be used. In one embodiment, cache memories are serially arranged so that data cached in the L1 cache is also cached in the L2 cache. If there happens to be a L3 cache, then data cached in the L2 cache is typically cached in the L3 cache as well. Thus, data cached at a particular cache level is also cached at all higher levels of the cache hierarchy.

As shown in FIG. 1, the computer system 100 may include more than one CPU (i.e., P>1), typically coupled to the system by way of bus 115. In such a system, it is typical for multiple CPUs to share the external memory 140. The present invention can be practiced in a single CPU computer system or in a multiple CPU computer system. It is further noted that other types of units (other than processors) which access external memory can function equivalently to the CPUs described herein and, therefore, are capable of performing the memory accessing functions similar to the described CPUs. For example, direct memory accessing ("DMA") devices can readily access memory similar to the processors described herein. Thus, a computer system having one CPU, but one or more of the memory accessing units would function equivalent to the multiple processor system described herein.

Generally, the decoder unit 205 fetches instructions from a storage location (such as external memory 140 ) holding the instructions of a program that will be executed and decodes these instructions. The decoder unit 205 forwards the instructions to the processor core 208. In the embodiment shown, the instructions are forwarded to the reservation station 210 and the reorder buffer 215. The reorder buffer 215 keeps a copy of the instructions in program order (in the case of an out-of-order processor). Each entry in the reorder buffer, which corresponds to a micro-instruction, includes a control field with one bit being a write-back data valid bit. The write-back data valid bit indicates whether an instruction can been retired. The reorder buffer 215 retires the instruction when the instruction has its write-back data valid bit set and when all previous instructions in the reorder buffer have been retired (i.e., in-order retirement). The reservation station 210 receives the instructions and determines their type (e.g., arithmetic logic unit "ALU" instruction, memory instruction, etc.). In one embodiment, the reservation station 210 dispatches instructions in an out of order manner.

For example, for an ALU instruction, the reservation station 210 dispatches the instruction to the execution units 220. The execution units 220 execute the instruction and return the result back to the reorder buffer and the register file 215 so that the result can be written to a register in the register file and the instruction can be retired. Memory instructions are dispatched to the MOU 230. Load instructions are placed in the load buffer 305 while store instructions are placed in the store buffer 310. The MOU 230 will throttle the processor core 208 and not accept an instruction if the buffer that the instruction is destined for (e.g., load or store buffer) is full, if there is an abort condition, or on other conditions.

The MOU 230 dispatches instructions (load, store, etc.) to the L1 cache controller 235. Generally, in certain situations the MOU 230 may dispatch instructions out of order. For example, if instruction two is dependent on instruction one and instruction three is independent of both instructions one and two, instruction two has to wait until the result of instruction one is available but instruction three can go ahead since it has no dependencies. Therefore, the MOU 230 may dispatch instruction one, then instruction three, and then instruction two (1, 3, 2).

Each instruction is forwarded to the L1 cache controller 235. The hit/miss detection logic 315 determines, among other things, whether the incoming instruction "hits" the L1 cache 320, fill buffers 325, WBB 340, or SB 345. The L1 cache controller 235 determines, among other things, whether the instruction is cacheable and whether the instruction is a load or store instruction.

Furthermore, in one embodiment, at least one CPU 110 supports temporal and non-temporal store instructions. Cacheable temporal store instructions follow temporal store semantics, i.e., they update the L1 cache 320. Similarly, cacheable non-temporal stores (also hereinafter referred to as "streaming stores") that "hit" a line in the L1 cache follow temporal semantics, although a biased LRU algorithm is used to minim ize pollution in the L1 cache, as described in copending U.S. patent application No. 09/053,386 entitled "Shared Cache Structure for Temporal and Non-Temporal Instructions" by Salvador Palanca et al. and assigned to the assignee of the present invention. However, cacheable (WB and WT) non-temporal stores that "miss" the L1 cache follow non-temporal semantics (i.e., they are weakly ordered write combining and only update external memory), as will be described in the following paragraphs with respect to the present invention.

If a WB temporal store instruction "hits" a M or an E line in the L1 cache 320, the L1 cache is updated with the data and the line is updated to M state (if in the E state). However, if the instruction "hits" a S line in the L1 cache, the line is invalidated, a fill buffer 325 is allocated, and the data from the instruction (e.g., register) is placed in the fill buffer. The fill buffer 325 then issues a bus request to the bus controller 245 to retrieve the rest of the line of data. When the store request is granted, the bus controller 245 first checks the L2 cache 130 to determine whether the data is in the same. If the data is in the L2 cache 130, a L2 cache "hit" occurs and the bus controller 245 retrieves the line of data from the L2 cache 130. If the data is not in the L2 cache 130, a L2 cache "miss" occurs and the bus controller 245 retrieves the line of data from external memory 140. In either case, the line of data is sent back to the fill buffer 325 and placed in the fill buffer in those bytes not written to by the WB temporal store instruction. The resulting line of data is placed back into the L1 cache by way of bus 335 and the line is updated to M state.

Table 1 illustrates the behavior of streaming stores for each memory type that "hit" and/or "miss" the L1 cache. The "Op" column defines the type of incoming instruction, in this case, streaming stores (i.e., non-temporal stores). The "Mem type" column describes the memory type, the "State" column describes the state of the line of data, and the "Hit/Miss" column describes whether there is a "hit" or a "miss" to the L1 cache. A "Hit L1" means a hit to L1 cache whereas a "Miss L1" means a miss to L1 cache 320, fill buffers 325, WBB 340, and SB 345.

TABLE 1

| Row | Op | Mem type | State | Hit/Miss | Action | Comments |
| --- | --- | --- | --- | --- | --- | --- |
| 1 | SS | WB | M, E | Hit L1 | Write to L1 cache, using biased LRU algorithm. | Update line to M if in E state. |
| 2 | SS | WB | S | Hit L1 | Invalidate line in cache, issue request to bus controller, bring line from L2 cache or external memory and send external snoop. Line in L1 cache is updated to M state. | Same behavior as temporal stores, but using a biased LRU algorithm to minimize pollution in the L1 cache. |
| 3 | SS | WB |  | Miss L1 | Allocate fill buffer in write combining (WC) Mode, send Flush L2 attribute (self snoop). | Behavior follows non-temporal semantics (WC). |
| 4 | SS | WT | M | Hit L1 | Write to L1 cache using biased LRU algorithm. |  |

TABLE 1-continued

| Row | Op | Mem type | State | Hit/Miss | Action | Comments |
|---|---|---|---|---|---|---|
| 5 | SS | WT | S, E | Hit L1 | Send Flush L2 attribute (self snoop). Update both L1 cache and external memory. | Same behavior as temporal stores, but use biased LRU algorithm. |
| 6 | SS | WT |  | Miss L1 | Allocate fill buffer in WC Mode, send Flush L2 attribute (self snoop). | Behavior follows non-temporal semantics (WC). |
| 7 | SS | USWC |  |  | Allocate fill buffer in WC Mode. | No self snoop directives sent because USWC is not aliased in this embodiment. |
| 8 | SS | WP |  |  | Allocate fill buffer in non-WC Mode, send Flush L1 and Flush L2 (self snoop). |  |
| 9 | SS | UC |  |  | Allocate fill buffer in non-WC Mode. | It maintains strong ordering. Self snoop directives only sent in the case of memory aliasing. |

On an incoming WB streaming store that "hits" a line of data in the L1 cache (Row 1), temporal store semantics are followed. That is, if the line of data is in the M or E state, the data is written to the L1 cache and the line is updated to the M state (if in the E state). On the other hand, if the line of data is in the S state, the line is invalidated and a fill buffer is allocated (Row 2). The fill buffer 325 issues a request to the bus controller 245 which brings the line of data from the L2 cache 130 or, if not in the L2 cache, from external memory 140. Other CPUs in the system, if any, are snooped for the line of data. If the line is in another processor's cache and is in the E or S state, it is invalidated, otherwise, if in the M state, the line is first written to external memory 140 from the snooped processor and then the line of data is written back to the fill buffer 325 from which the request originated. The line of data is then placed in the L1 cache 320 and updated to the M state. To minimize cache pollution on a WB streaming store that "hits" the L1 cache (Rows 1 & 2), a biased LRU algorithm is used.

On an incoming WB streaming store that "misses" the L1 cache (Row 3), non-temporal semantics are followed. In particular, a fill buffer 325 is allocated in write combining mode (i.e., WCFB). Once the WCFB is allocated, it does not issue a bus request to the bus controller 245 to write the line of data to external memory 140. Rather, the WCFB write combines with other weakly-ordered write combinable store instructions of the same type (e.g., a WB or WT streaming store that "misses" the L1 cache) that "hit" the fill buffer until all bytes in the WCFB are written (i.e., all BW bits are set) or there is an eviction condition, in which case the fill buffer issues a request to the bus controller 245 to write the line to external memory 140. The L2 cache is snooped and flushed when the request is issued to the bus controller 245. That is, if the line of data is in the L2 cache and in M state, the line is written to external memory 140 and then invalidated, otherwise the line is invalidated. This procedure will be described in detail with respect to Table 2.

On an incoming WT streaming store that "hits" a M line in the L1 cache (Row 4), the L1 cache controller follows temporal store semantics as described with respect to Row 1. Moreover, on an incoming WT streaming store that "hits" a S or an E line in the L1 cache (Row 5), the L1 cache controller follows WT temporal store semantics. That is, both L1 cache and external memory are updated and the L2 cache is snooped and flushed, as described with respect to Row 3. However, on an incoming WT streaming store that "misses" the L1 cache (Row 6), the L1 cache controller follows non-temporal store semantics, as described with respect to Row 3.

On an incoming USWC streaming store (Row 7), a fill buffer 325 is allocated in write combining mode (i.e., WCFB). The L1 cache controller neither checks L1 cache nor issues snooping because a USWC streaming store is not memory aliased. Memory aliasing occurs when the same line of data can be accessed by two instructions having different memory types. Since USWC is not aliased and always writes to external memory, it implies that a USWC request can never "hit" the caches. Therefore, no self-snooping is needed upon issuing the request to the bus controller 245. If other embodiment allow USWC aliasing, self-snooping directives to flush the L1 cache and L2 cache would be necessary. On an incoming WP streaming store (Row 8), a fill buffer is allocated (NWCFB) and both L1 and L2 are snooped and flushed. On an incoming UC streaming store (Row 9), the L1 cache controller allocates a fill buffer (NWCFB). This instruction is strongly ordered and causes eviction of allocated WCFBs.

Table 2 illustrates the behavior of streaming stores for each memory type that "hit" a WBB 340 and/or SB 345, NWCFB, and WCFB.

TABLE 2

| Row | Op | Mem type | Hit/Miss | Action | Comments |
|---|---|---|---|---|---|
| 1 | SS | All | Hit WBB or SB | Block incoming SS. | No change with respect to regular or temporal stores. |

TABLE 2-continued

| Row | Op | Mem type | Hit/Miss | Action | Comments |
|---|---|---|---|---|---|
| 2 | SS | WB | Hit NWCFB | Merge if fill buffer that was hit is: (1) WB store before global observation (2) globally observed in M state, or (3) globally observed in E state and RepEn control field is set. Otherwise, block incoming SS. | |
| 3 | SS | WT | Hit NWCFB | Merge if fill buffer that was hit is: (1) WB store before global observation or (2) globally observed in M state. Otherwise, block incoming SS. | WT streaming stores will only merge with a NWCFB if there is memory aliasing. |
| 4 | SS | USWC | Hit NWCFB | | USWC streaming stores should never hit a combinable NWCFB since USWC is not memory aliased. |
| 5 | SS | WP, UC | Hit NWCFB | Block incoming streaming store. | No change with respect to temporal stores. |
| 6 | SS | WB, WT, USWC | Hit WCFB | Write combine until eviction. | |
| 7 | SS | WP, UC | Hit WCFB | Block incoming streaming store. Evict WCFB. | No change with respect to regular stores. |

An incoming streaming store that "hits" either the WBB 340 or SB 345 (Row 1), irrespective of the memory type, is blocked until the WBB 340 or SB 345 is deallocated. On an incoming WB streaming store that "hits" a NWCFB (Row 2), if the the memory and instruction type in the NWCFB is a WB store, the incoming WB streaming store will merge (write to the bytes addressed by the incoming WB streaming store) with the original WB store for which the NWCFB was allocated (see items (1) and (2) in "Action" field). The line of data brought from the bus controller 245 does not overwrite the bytes written from the processor core 208 on an incoming store instruction (in the case where the line of data is brought into the fill buffer after the bytes are written from the core). However, the bytes written from the processor core 208 do overwrite the corresponding bytes of the line of data brought into the fill buffer (in the case where the line of data is brought into the fill buffer before the bytes are written from the core).

Additionally, an incoming WB streaming store that "hits" a NWCFB will merge with the same if the NWCFB is globally observed in the E state and the "RepEn" bit is set (e.g., the NWCFB is globally observed in the E state and was originally allocated to service a WB load, which is not a prefetch to L2 cache). Otherwise, on other WB streaming store hits to a NWCFB, the WB streaming store is blocked until the NWCFB has been deallocated. Global observation occurs when the line of data (1) is found in the L2 cache, (2) is found in a cache of another processor (in the case of a multi-processor system), or (3) when the line is neither found in the L2 cache nor in a cache of another processor (i.e., the data is in external memory).

On an incoming WT streaming store that "hits" a NWCFB (Row 3), the WT streaming store merges with the NWCFB if it is globally observed in the M state or the NWCFB is servicing a WB store, otherwise the incoming WT streaming store is blocked. In one embodiment, where only WB is globally observed in M state, it implies that upon a hit, a WT streaming store can only merge with a NWCFB servicing a WB store.

It is to be noted that an incoming USWC streaming store (based on this embodiment) will never "hit" a NWCFB because a USWC instruction is not memory aliased (Row 4). An incoming WP or UC streaming store that "hits" a NWCFB is blocked because each is a strongly ordered instructions with respect to other NWCFB instructions (Row 5). An incoming WB and WT streaming stores and an incoming USWC streaming store that "hits" a WCFB, write combine with the WCFB (Row 6). The WCFB remains in write combining mode and will not issue a request to the bus controller 245 to write the line of data to external memory until the WCFB is full (i.e., all BW bits are set) or there is an eviction condition (e.g., detection of a UC instruction). Finally, an incoming UC or WP streaming store that "hits" a WCFB causes eviction of the WCFB and is blocked until the WCFB is deallocated (Row 7).

Table 3 illustrates the behavior of a fill buffer allocated for a streaming store upon an incoming load or store instruction. Under the "Hit/Miss" heading two possibilities exist. A "Hit SS WCFB" is a fill buffer that is allocated for a USWC streaming store, or a WB or WT streaming store that "missed" the L1 cache. A "Hit SS NWCFB" is a fill buffer that is allocated for a UC or WP streaming store, a WB streaming store that "hits" a S line in the L1 cache, or a WT streaming store that "hits" an E or a S line in the L1 cache.

TABLE 3

| Row | Op | Mem type | Hit/Miss | Action | Comments |
|---|---|---|---|---|---|
| 1 | Load | All | Hit SS WCFB | Evict WCFB and block incoming load. | |
| 2 | Load | All | Hit SS NWCFB | Block incoming load. | |
| 3 | Store | WB, WT | Hit SS WCFB | Block incoming store, unless it is a streaming store. If blocked, evict WCFB. | If incoming store is a streaming store, write combine until eviction. |
| 4 | Store | USWC | Hit SS WCFB | Write combine incoming store. | |
| 5 | Store | WP, UC | Hit SS WCFB | Block incoming store. Evict WCFB. | |
| 6 | Store | All | Hit SS NWCFB | Block incoming store, unless the NWCFB has a WB SS and the incoming store is a WB store, including SS, or it is a WT SS. | |

An incoming load instruction that "hits" a streaming store WCFB (Row 1), irrespective of the memory type, causes eviction of the WCFB and the incoming load is blocked until the WCFB is deallocated. An incoming load instruction that "hits" a streaming store NWCFB (Row 2), irrespective of memory type, is blocked until the NWCFB is deallocated. An incoming WB or WT store instruction that "hits" a streaming store WCFB (Row 3) is blocked, unless it is a streaming store instruction, in which case the incoming streaming store write combines with the WCFB. If the store is blocked, it evicts the WCFB. An incoming USWC store that "hits" a streaming store WCFB write combines with the WCFB (Row 4).

Moreover, an incoming WP or UC store that "hits" a streaming store WCFB (Row 5) causes eviction of the WCFB and is blocked until the WCFB is deallocated. Finally, an incoming store that "hits" a streaming store NWCFB (Row 6) is blocked, unless the NWCFB has a WB streaming store (i.e., hit S line in L1 cache) and the incoming store is a WB store, including a streaming store, or a WT streaming store.

Figure 5B:
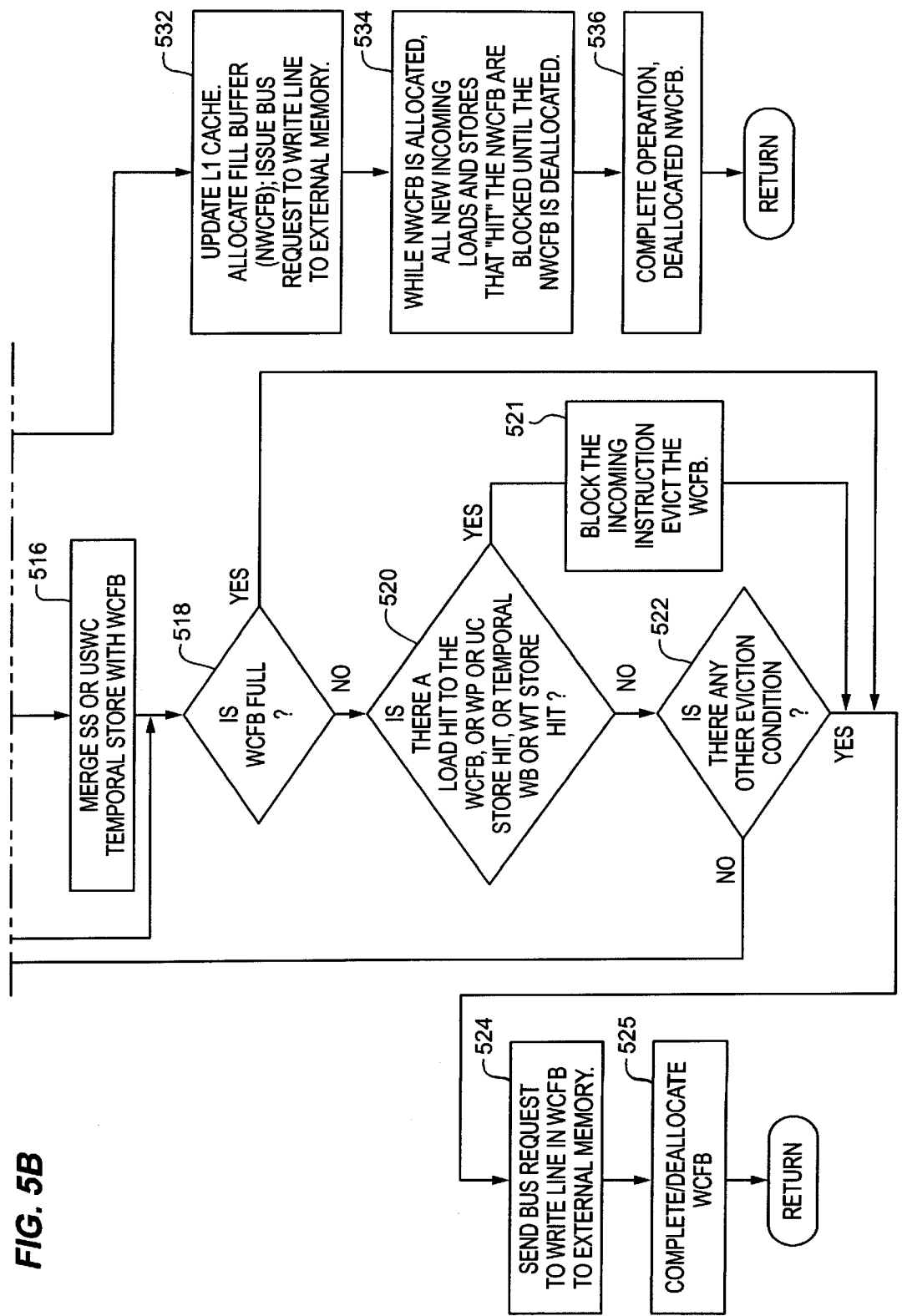
FIG. 5 is a flow diagram illustrating an exemplary process of implementing the present invention.

FIG. 5 is a flow diagram illustrating an exemplary process 500 of implementing the present invention. Referring to FIG. 5, the process 500 commences at block 502 where an incoming streaming store instruction is detected (e.g., by the L1 cache controller 235). On a WP or UC streaming store, the process moves to block 504 where a fill buffer is allocated (NWCFB) and, at block 506, a bus request is issued to the bus controller to write the line of data to external memory. At block 508, the line of data is written to external memory and, at block 510, the operation is completed with the deallocation of the fill buffer.

At block 502, if the incoming streaming store instruction is a USWC or a WB or WT that "missed" the L1 cache and fill buffers, the process moves to block 512 where a fill buffer is allocated in write combining mode (i.e., WCFB). The process then moves to block 514 where a determination is made as to whether there is a new incoming instruction and whether the new incoming instruction is a USWC store, or a WB or WT streaming store instruction that "hit" the WCFB. If so, the process continues to block 516, otherwise the process moves to block 518. At block 516 the new incoming store instruction is write combined with the WCFB. At block 518, a determination is made as to whether the line of data in the WCFB is full (i.e., whether all the BW bits are set). If the WCFB is not full the process moves to block 520, otherwise the process moves to block 524.

At block 520, if there is a load "hit", a WP or UC store "hit", or a temporal WB or WT store "hit" to the WCFB, the process moves to block 521, otherwise the process moves to block 522. At block 521, the incoming instruction is blocked and the WCFB is marked for eviction. At block 522, if there is any other eviction condition, the process continues to block 524, otherwise the process moves back to block 514 for detection of a new incoming store instruction. At block 524, in response to the eviction condition, a bus request is issued to write the line of data in the WCFB to external memory.

Referring back to block 502, if the incoming streaming store instruction is a WB that "hit" a S line in the L1 cache, the process moves to block 526. At block 526, the line in the L1 cache is invalidated, a fill buffer is allocated (i.e., NWCFB), and a bus request is issued to the bus controller to bring the line of data from the L2 cache or external memory (this may takes dozens of clock cycles). At block 528, if while the NWCFB is allocated, a new incoming WB, temporal or non-temporal, or WT streaming store "hits" the NWCFB, the incoming store instruction merges with the NWCFB. Other incoming stores and all load hits are blocked. At block 530, the line of data is placed in the L1 cache and the NWCFB is deallocated.

Referring back to block 502 again, if the incoming streaming store instruction is a WT that "hit" a S or an E line in the L1 cache, the process moves to block 532 where a fill buffer is allocated (NWCFB) and a bus request is issued to the bus controller to write the line of data to external memory and update the L1 cache (this may takes dozens of clock cycles). At block 534, while the NWCFB is allocated, all new loads and stores that "hit" the NWCFB are blocked until the NWCFB is deallocated.

At block 502, if the incoming streaming store instruction is a WB that "hit" a M or an E line or a WT that "hit" a M line in the L1 cache, the process moves to block 538. At block 538, the L1 cache is updated using a biased LRU algorithm to reduce pollution of the cache and the line transitions to M state.

The present invention provides several advantages over prior art architectures. Specifically, the present invention provides for non-temporal semantics which reduces cache pollution. In addition, the present invention allows certain instructions to be weakly-ordered and write combinable with other instructions up to a line of data to minimize bus transactions while preserving ordering with respect to memory mapped I/O or strongly ordered instructions. Moreover, an application programmer can choose between caching data or writing data directly to external memory.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A processor comprising:
   a decoder to decode instructions and to identify a first instruction as being associated with a first write back or write through non-temporal store, a non-temporal store comprising data that is to be utilized by the processor no more than a limited amount of number of times within a predetermined period; and
   a circuit, in response to the decoded first instruction, to,
   detect the first write back or write through non-temporal store that misses a cache, and
   allocate a buffer for the first write back or write through non-temporal store in write combining mode.

2. The processor of claim 1 wherein the circuit, in response to a second decoded instruction identified as being associated with a second write back or write through non-temporal store, to,
   detect the second write back or write through non-temporal store that hits the buffer, and
   merge the second write back or write through non-temporal store with the buffer.

3. The processor of claim 1 wherein the circuit, in response to a second decoded instruction identified as being associated with a uncacheable speculative write combining store, to,
   detect the uncacheable speculative write combining store that hits the buffer, and
   merge the uncacheable speculative write combining store with the buffer.

4. The processor of claim 1 wherein when the buffer is full, the circuit to issue a bus request to write the contents of the buffer to external memory.

5. The processor of claim 1 wherein the circuit, in response to a second decoded instruction, to,
   evict the buffer, and
   block the second decoded instruction until the buffer is deallocated.

6. The processor of claim 5 wherein the second decoded instruction is a strongly ordered instruction.

7. The processor of claim 1 wherein the circuit is a cache controller.

8. The processor of claim 1 wherein the buffer is a fill buffer.

9. A method for implementing non-temporal stores in a processor, the method comprising:
   detecting a first instruction associated with a first write-back or write-through store;
   determining whether the first write-back or write-through store is temporal or non-temporal, a temporal store comprising data that is likely to be utilized repeatedly within a predetermined period, a non-temporal store comprising data that is likely to be utilized no more than a few times within the predetermined period;
   determining whether the first write-back or write-through store hits or misses the cache closest to the processor;
   if the first write-back or write-through is non-temporal and misses the cache, allocating a buffer in write combining mode; and
   writing the first write-back or write-through store in the buffer.

10. The method of claim 9, further comprising:
    detecting a second instruction associated with a second write-back or write-through store;
    determining whether the second write-back or write-through store is temporal or non-temporal; and
    if the second write-back or write-through store is non-temporal, misses the cache, and hits the buffer, merging the second write-back or write-through store into the write combining buffer.

11. The method of claim 9, further comprising:
    if the first write-back or write-through store is non-temporal and hits the cache, updating the cache.

12. The method of claim 9, further comprising:
    detecting a second instruction associated with a second write-back or write-through store;
    determining whether the second write-back or write-through store is temporal or non-temporal;
    if the second write-back or write-through store is temporal and hits the buffer, blocking the second write-back or write-through store; and
    evicting the data associated with the first write-back or write-through store along with any other data merged into the write combining buffer in write combining mode.

13. The method of claim 12, further comprising:
    allocating the buffer in non-write combining mode; and
    writing the second write-back or write-through store to the buffer in non-write combining mode.

14. The method of claim 9, further comprising:
    flushing all data written to the write combining buffer from at least one lower level cache.

15. The method of claim 9, wherein an incoming load hits the buffer, further comprising:
    blocking the incoming load;
    evicting the write-back or write-through store; and
    writing the write-back or write-through store to main memory.

16. A method for implementing non-temporal stores in a processor, the method comprising:
    detecting an instruction associated with a non-temporal write-back store;
    determining that the non-temporal write-back store hits on a non-write combining fill buffer;
    merging the non-temporal write-back store with the non-write combining fill buffer if one of the following conditions is met,
    a) the non-write combining fill buffer is currently servicing a write-back store,
    b) the non-write combining fill buffer is globally observed in the modified state, and
    c) the non-write combining fill buffer is globally observed in the exclusive state and the buffer is ready to write the data contained within the buffer to the cache level closest to the processor.

17. The method of claim 16, wherein the none of the conditions are met, further comprising:
    blocking the non-temporal write-back store.

18. A method for implementing non-temporal stores in a processor, the method comprising:
    detecting an instruction associated with a non-temporal write-through store;

determining that the non-temporal write-through store hits on a non-write combining fill buffer;

merging the non-temporal write-through store with the non-write combining fill buffer if one of the following conditions is met, a) the non-write combining fill buffer is currently servicing a write-back store, b) the non-write combining fill buffer is globally observed in the modified state.

19. The method of claim 18, wherein the none of the conditions are met, further comprising:

blocking the non-temporal write-through store.

\* \* \* \* \*